Feb. 15, 1938.                R. C. HOBSON                2,108,124
                            CUSHIONING DEVICE
                         Filed Jan. 21, 1936            2 Sheets-Sheet 1
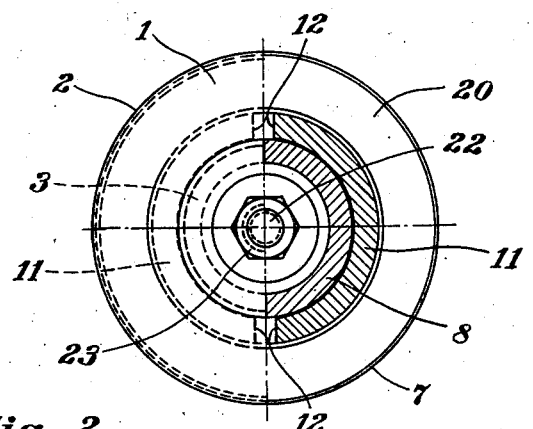
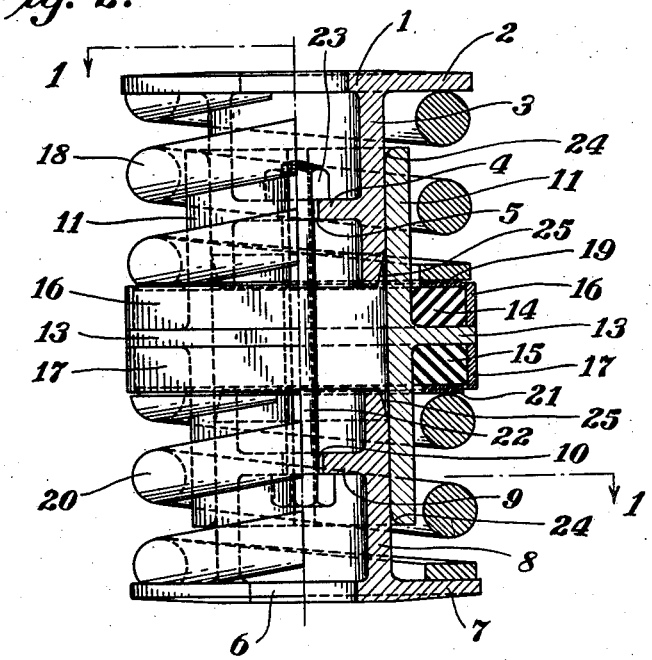
INVENTOR
*Roy C. Hobson*
BY
*Clarence D. Kerr*
ATTORNEY Feb. 15, 1938.    R. C. HOBSON    2,108,124
CUSHIONING DEVICE
Filed Jan. 21, 1936    2 Sheets-Sheet 2
Fig. 3.
Fig. 4.
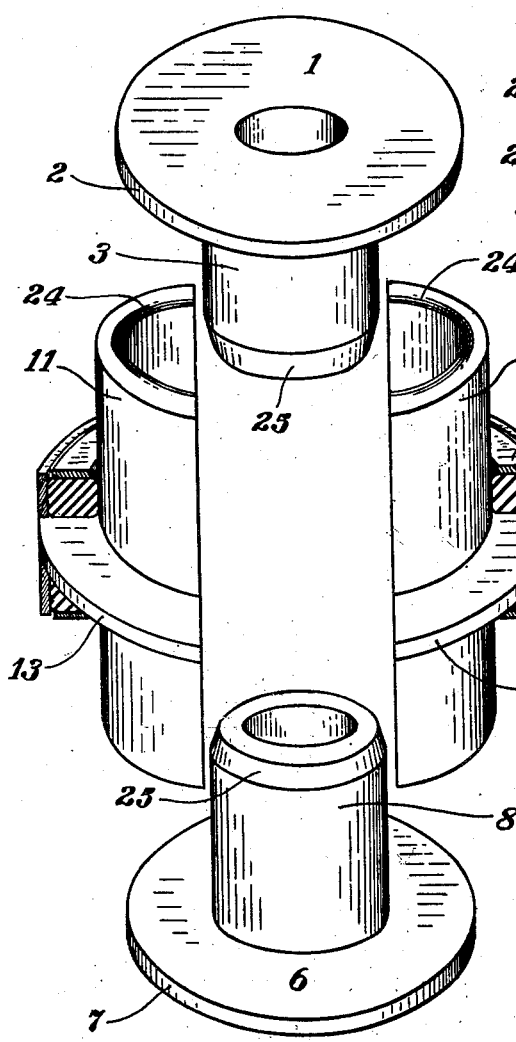
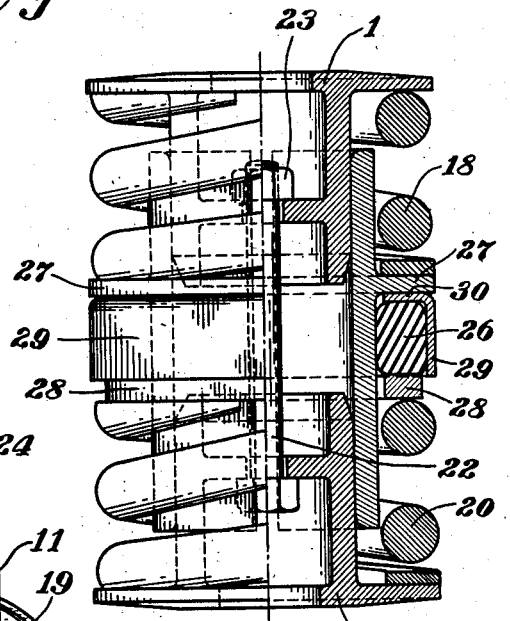
INVENTOR
Roy C. Hobson
BY
Clarence D Kerr
ATTORNEY Patented Feb. 15, 1938

2,108,124

UNITED STATES PATENT OFFICE 2,108,124

CUSHIONING DEVICE

Roy C. Hobson, Cleveland Heights, Ohio, assignor to National Malleable and Steel Castings Company, Cleveland, Ohio, a corporation of Ohio Application January 21, 1936, Serial No. 60,056

15 Claims. (Cl. 267—9)

This invention relates to cushioning devices, the embodiment described and illustrated being particularly adapted for use as a bolster support for railway car trucks.

The principal object of this invention is a cushioning device that is simple and inexpensive to manufacture and in which an elastic material such as rubber is used to control the amount of friction developed. Other objects and advantages will be apparent from the following description taken in conjunction with the drawings in which:

Fig. 1 is a view partly in plan and partly in horizontal section of a detailed embodiment of my invention, taken on line 1—1 of Fig. 2, Fig. 2 is a view partly in elevation and partly in vertical section of the device shown in Fig. 1, Fig. 3 is a view in perspective of the various elements of the device, and Fig. 4 is a view partly in elevation and partly in vertical section of a modification.

Referring to Figs. 1 to 3 of the drawings, the follower 1 has a circular flange 2 and an inwardly extending cylindrical projection 3. Between the ends of the follower there is a transverse wall 4 having an opening 5 therein. Follower 6 may be similarly formed with a circular flange 7, cylindrical projection 8, transverse wall 9 and opening 10.

A pair of friction shoes 11, 11 engage opposite sides of followers 1 and 6. These shoes may be substantially semicircular in section. When assembled, the vertical edges of the shoes are spaced apart as indicated at 12, 12 to provide for wear between the shoes and followers. On the outside of each shoe and between the ends thereof is a flange 13, and positioned on each side of flanges 13, 13 are rings 14, 15 of elastic material such as rubber. Surrounding these rings and serving to prevent radial expansion thereof are metal cylinders 16, 17. A helical spring 18 is interposed between a plate 19 and the flange 2 of follower 1. In like manner spring 20 is positioned between plate 21 and flange 7 of follower 6. A tie bolt 22 passes through openings 5 and 10 in the followers and is secured by the nut 23. This bolt serves to hold the parts in assembled relation and to regulate the amount of initial compression of the springs 18 and 20 and of rings 14 and 15.

It is desirable to make the inside diameter of the rubber rings 14, 15 slightly smaller than the assembled outside diameter of the shoes 11, 11, so that when the parts are assembled the rings are placed under initial stress. In order then, to slip the assemblies of rings and cylinders over the shoes the latter must be moved together until their edges 12, 12 contact. To facilitate the insertion of the followers 1 and 6, under these conditions, the shoes may be rounded at their ends, as at 24, and the followers beveled at one end as at 25. When the followers are inserted, the shoes are separated, placing the rubber in compression.

By providing this initial stress in the rubber rings, the shoes are maintained in contact with the followers even though wear takes place. Moreover, such initial stress serves to keep the lower ring 17 (Fig. 2) in position and prevents it from slipping down onto spring 20.

In operation, the load is applied to either end of the device causing the followers 1 and 6 to approach each other and compressing the springs 18 and 20. The pressure of these springs compresses the rubber rings 14, 15, and, since the cylinders 16, 17 prevent movement of the rubber outwardly, the shoes 11, 11 are forced into tighter engagement with the followers. Upon removal of the load the springs 18, 20 return the parts to their original position.

Thus it will be seen that friction is developed between the shoes and followers to augment the capacity of springs 18, 20 upon compression thereof and to snub the recoil of said springs upon release. The amount of friction developed can, to a certain extent, be varied by changing the composition, length or other dimensions of the rubber rings. In general, an increase in length of the rings longitudinally of the mechanism results in an increase in friction due to the fact that the longer ring changes its form more readily with an increase in the load and hence causes a greater proportion of the load to be directed inwardly against the shoes. Likewise, a decrease in length of the rubber rings decreases the amount of friction developed. In this manner the total capacity of the device can be varied over a wide range.

In certain instances, as when the device is to be used as a bolster support or in a standard draft gear pocket, the space into which the device must be placed is fixed as to size by established standards. In such cases my invention provides effective means for varying the proportion of the frictional capacity to the spring capacity. By lengthening or shortening the rubber rings, the amount of friction is varied as above described, and the increase or decrease in the length of the coil springs required to maintain the same overall length of the device will, of course, change the capacity of the coil spring. It is, of course, evident that where there are no space limitations the capacity of the mechanism, both spring and friction, can be varied over a much wider range.

In Fig. 4 there is shown a modification in which a single rubber block 26 is used. The flanges 27, 27 on the shoes are placed to one side of the transverse center line so that the rubber ring is positioned equidistant from the ends of the shoes. By offsetting the flange with a single ring, the inward pressure on the shoes is divided equally between the two followers. In Fig. 4 the followers 1 and 6 and springs 19 and 20 are the same as the corresponding parts of Figs. 1-3. Since the single rubber block 26 is not as long as the combined length of blocks 14, 15, the plate 28, interposed between spring 20 and block 26, is shown thicker than plates 19, 21 of Figs. 1-3 so as to maintain the same over-all length. The ring 29 surrounding the block 26 is provided with an inturned flange 30 to prevent the ring from slipping down on the spring if for any reason the initial compression on the rubber is insufficient to hold the ring in place.

It will be noted that by providing for relative movement between each follower and the shoes my device has a much larger wear area, with resulting increase in life, than if the shoes were made integral with one of the followers. Furthermore, since the total travel of the cushioning mechanism is equal to the sum of the travel of each follower relative to the shoes, it will be appreciated that each follower moves only half as fast, relative to its end of the shoes, as it would if the same total travel was obtained between the shoes and one follower. It follows therefore that the heat between the friction surfaces has more time to be dissipated, resulting in cooler operation of the device. Furthermore, the heat is generated at points removed from the rubber ring and the latter is placed on the outside of the shoes where it will be in contact with the cooler air, whereby any deleterious effect that the heat might have on the rubber will be reduced to a minimum.

Oversolid protection for the springs may be provided by contact between the inner ends of the housings 1 and 6 before the springs go solid or by contact between the flanges 2 and 7 with the ends of the shoes. While I have shown two shoes in both forms of the invention illustrated it will be understood that any number may be used if desired.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A cushioning mechanism comprising a pair of followers, friction shoes each engaging both of said followers, spring means surrounding said shoes and engaging an end of each follower and means cooperating with said spring means for transmitting pressure applied thereto inwardly against said shoes to force the latter into engagement with said followers.

2. In a cushioning mechanism a pair of followers, friction surfaces on said followers, friction shoes engaging said surfaces each shoe having an outwardly extending flange, coil springs surrounding said shoes and positioned between said flange and an end of each follower, rubber means interposed between said flange and one of said springs and means surrounding said rubber means and preventing outward movement thereof.

3. In a cushioning mechanism a pair of followers, friction surfaces on said followers, friction shoes engaging said surfaces each shoe having an outwardly extending flange, coil springs surrounding said shoes and positioned between said flange and an end of each follower, rubber means interposed between said flange and each of said springs and means surrounding said rubber means and preventing outward movement thereof.

4. In a cushioning mechanism a pair of followers each comprising a cylindrical portion and an outwardly extending flange at one end thereof, shoes frictionally engaging the cylindrical portions of said followers, coil springs positioned between said followers and portions of said shoes, and means between said coil springs and said portions for varying the amount of friction between said shoes and followers, said means including a member of resilient material.

5. In a cushioning mechanism a pair of followers each comprising a substantially cylindrical portion and an outwardly extending flange at one end thereof, a shoe frictionally engaging the outer surfaces of said cylindrical portions, said shoe having an outwardly extending flange at a point remote from said frictionally engaging surfaces, spring means extending from the flanges on said followers toward said shoe flange and means including a rubber element in cooperative relation with said spring means and shoe flange for directing the load on said spring means inwardly to force said shoe into closer engagement with said cylindrical portions of said followers.

6. In a cushioning mechanism a pair of followers, friction surfaces on said followers, friction shoes engaging said surfaces each shoe having an outwardly extending flange, a coil spring surrounding said shoes and positioned between one side of said flange and one of said followers, rubber means on the other side of said flange and a coil spring between said rubber means and the other of said followers.

7. In a cushioning mechanism a pair of followers, friction surfaces on said followers, friction shoes engaging said surfaces each shoe having an outwardly extending flange, a coil spring surrounding said shoes and positioned between one side of said flange and one of said followers, rubber means on the other side of said flange and a coil spring between said rubber means and the other of said followers, and means surrounding said rubber means and preventing outward movement thereof.

8. In a cushioning mechanism a pair of followers, friction surfaces on said followers, friction shoes engaging said surfaces each shoe having an outwardly extending flange, a coil spring surrounding said shoes and positioned between one side of said flange and one of said followers, rubber means on the other side of said flange and a coil spring between said rubber means and the other of said followers, and means surrounding said rubber means and preventing outward movement thereof, said last mentioned means having a portion thereof extending between said rubber means and said flange.

9. In a cushioning mechanism a pair of followers, friction surfaces on said followers, friction shoes engaging said surfaces each shoe having an outwardly extending flange, coil springs surrounding said shoes and positioned between said flange and an end of each follower, rubber means interposed between said flange and one of said springs and means surrounding said rubber means and preventing outward movement thereof, said last mentioned means having a portion thereof extending between said rubber means and said flange.

10. A cushioning mechanism comprising a pair of followers, friction surfaces on one of said followers, friction shoes engaging said surfaces, spring means surrounding said shoes and adapted to be compressed by relative movement of said followers, and means of solid resilient material external to said shoes and cooperating with said spring means for transmitting pressure applied thereto inwardly against said shoes to force the latter into engagement with said friction surfaces.

11. A cushioning mechanism comprising a pair of followers, friction surfaces on one of said followers, friction shoes engaging said surfaces, rubber means surrounding said shoes, and spring means cooperating with said rubber means and said followers for applying pressure to said rubber means upon relative movement of said followers.

12. A cushioning mechanism comprising a pair of followers, friction surfaces on said followers, friction shoes engaging said surfaces, spring means adapted to be compressed by relative movement of said followers, and rubber means cooperating with said spring means for transmitting pressure applied thereto against the shoes in a direction transverse to the direction of compression of said spring means.

13. A cushioning mechanism comprising a pair of followers, friction surfaces on said followers, friction shoes engaging said surfaces, spring means adapted to be compressed by relative movement of said followers, and rubber means cooperating with said spring means for transmitting pressure applied thereto against the shoes in a direction transverse to the direction of compression of said spring means, said rubber means being located on said shoes in zones extending over areas remote from said friction surfaces.

14. A cushioning mechanism comprising a pair of followers, friction surfaces on said followers, friction shoes each engaging a friction surface on both of said followers, cushioning means surrounding said shoes and extending from each follower toward the centers of said shoes, and means between said cushioning means and said shoes adapted to transmit pressure applied thereto inwardly against said shoes to force the latter into engagement with said followers.

15. A cushioning mechanism comprising a pair of followers, friction surfaces on said followers, friction shoes each engaging a friction surface on both of said followers, an outwardly extending flange on each of said shoes, cushioning means surrounding said shoes and extending from each of said followers toward said flanges, and means between said cushioning means and said flanges adapted to transmit pressure applied thereto inwardly against said shoes to force the latter into engagement with said followers.

ROY C. HOBSON.